Aug. 20, 1935.　　　　B. L. BOBROFF　　　　2,011,966
AUTOMATICALLY RELEASED DIRECTION SWITCH FOR AUTOMOTIVE VEHICLES
Filed Nov. 23, 1931
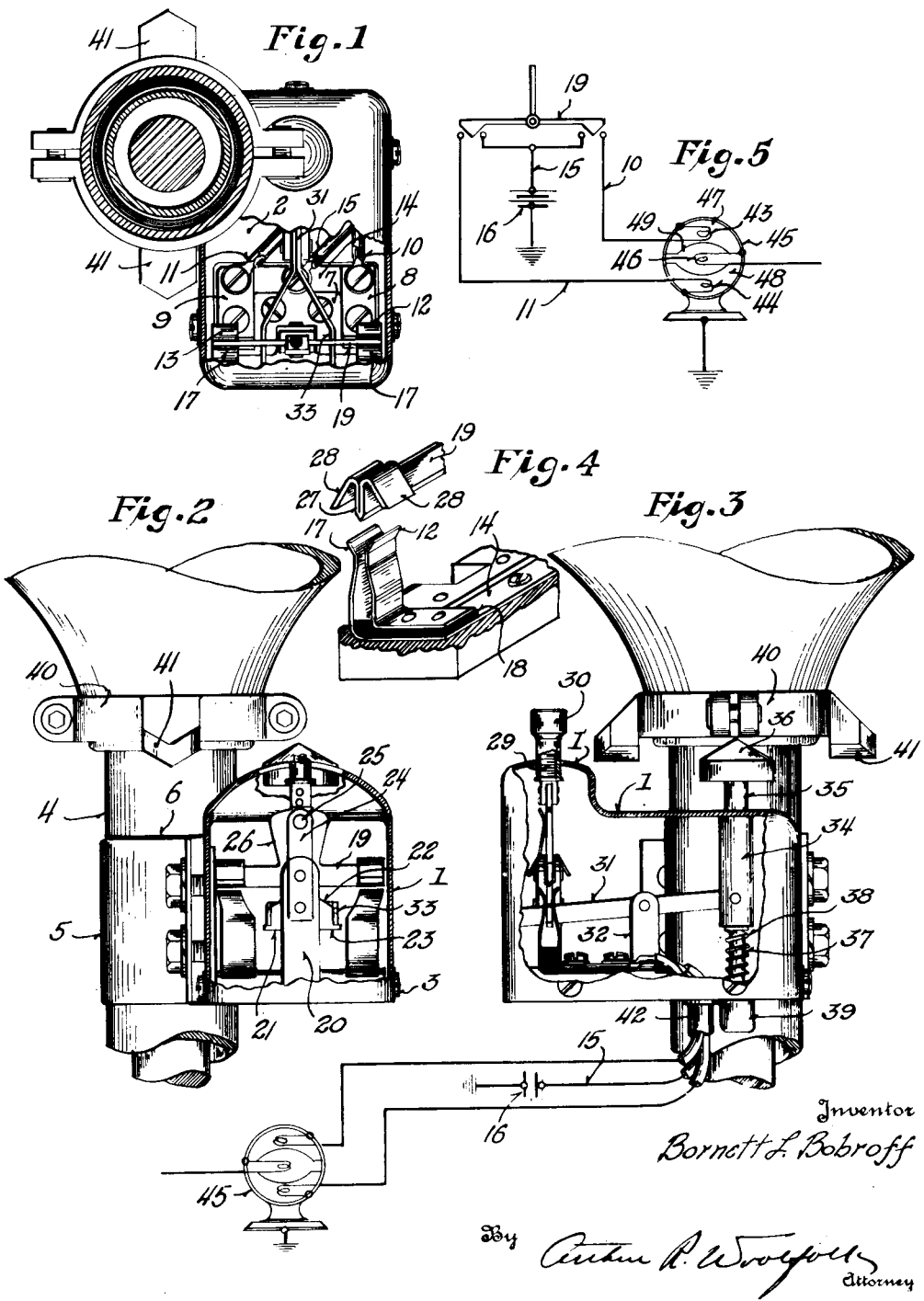

Patented Aug. 20, 1935

2,011,966

UNITED STATES PATENT OFFICE 2,011,966

AUTOMATICALLY RELEASED DIRECTION SWITCH FOR AUTOMOTIVE VEHICLES

Bornett L. Bobroff, Racine, Wis.

Application November 23, 1931, Serial No. 576,790

4 Claims. (Cl. 200—59)

This invention relates to direction switches for automotive vehicles and is particularly directed to an automatically released direction switch.

Objects of this invention are to provide a direction switch for automotive vehicles which is so constructed that the driver merely initially closes the switch to indicate the particular direction which he intends taking, means being provided for automatically releasing the switch and restoring it to neutral position after the turn has been made, so that no further thought or effort is required of the operator.

Further objects are to provide a direction indicating switch for automotive vehicles which is so made that it may be readily positioned on the steering column or in some readily accessible position, and to so construct the switch that when the driver desires to turn to the left or right, he swings a button or other member to the left or right, respectively, so that the operation of the switch is identically the same as the natural tendency of the operator would be.

Further objects are to provide an automatically released direction switch in which the movable member is normally disconnected from every portion of the wiring system so that there is no necessity for bringing a lead to this movable member or to its pivotal support on one hand, and on the other hand so that there is no danger of short-circuiting and no unnecessary complication of the apparatus.

Further objects are to provide means automatically operable from the steering mechanism to restore the switch to neutral position, irrespective of the side to which the switch is rocked, and to provide a construction which is sturdy, simple and substantially fool-proof.

An embodiment of the invention is shown in the accompanying drawing, in which:

Figure 1 is a plan view of the device, with portions broken away and with the steering column in section.

Figure 2 is a rear elevation of the device, with parts broken away.

Figure 3 is a side elevation of the device, with parts broken away.

Figure 4 is a detail of the movable and stationary contacts.

Figure 5 is a schematic diagram showing the wiring.

Referring to the drawing, it will be seen that the device comprises a housing 1, which is provided with a removable base 2 held in place in any suitable manner, as by means of the screws 3.

The housing is clamped to the steering column 4 by means of the clamp 5, and an insulating sheet 6 is interposed between the steering column and the clamp and housing so as to prevent electrical connection between such members.

Within the housing an insulating plate 7 is provided and carries the terminal members 8 and 9, which respectively receive the conductors 10 and 11. These terminal members 8 and 9 are secured to the insulating base plate and are provided with stationary contact lips or contact members 12 and 13, respectively.

A third contact member 14 is carried by the insulating plate 7 and receives the conductor 15 leading to the battery 16, the other side of the battery being grounded, as indicated in Figure 5. The central terminal member 14 is preferably continued rearwardly and upwardly to provide the stationary contacts 17 which are adjacent the contacts 12 and 13, but insulated therefrom by the insulating member 18, see Figure 4. This provides a very simple and easily produced construction.

The stationary contact members 12, 13 and 17 are, in each instance, provided with outwardly turned lips, as shown in Figure 4.

The movable contact member is indicated at 19 in Figures 1, 2, 4 and 5. It is pivotally mounted between a pair of uprights 20, see Figure 2, which are carried by the insulating base plate 7. The uprights 20 carry a block 21 which is bevelled adjacent its upper end, as indicated at 22, and which is provided with ears 23 adjacent its lower ends for a purpose hereinafter to appear.

Further, one of the uprights 20 carries a leaf spring 24 which is provided with a forwardly bulged portion 25 adapted to snap into a recess or depression formed in the vertical extension 26 of the movable contact member 19, as shown in Figure 2. The movable or pivotally mounted contact member 19 is provided with contacts at its ends which are duplicates in construction and one of which is illustrated in detail in Figure 4. These contacts are provided with a central portion 27 which has a tapered bottom end adapted to enter between the blades 12 and 17 or 13 and 17, as the case may be, and to thus close the circuit between such stationary contacts. However, these stationary contacts sometimes spring apart or become corroded or pitted. To avoid this tendency and to secure a very firm engagement between the movable contacts and the stationary contacts, which movable contact is provided with downwardly and outwardly flaring lips 28, see Figure 4, which slide over the outwardly projecting lips of the stationary contactions, and additionally make contact with such stationary contacts, but also force such stationary contacts inwardly into binding engagement with the central portion 27 of the movable contact. There is thus not the slightest possibility of the switch failing in operation.

The vertical member 26 of the rocking contact member has riveted thereto a threaded upwardly projecting stem 29 which receives the threaded insulating, manually operable button or handle 30, see Figure 3. The shank of the button 30 preferably extends downwardly through a slot provided in a raised portion 1' of the housing 1, as indicated in Figure 3, to thereby insulate the rocking member from the housing.

The restoring means for returning the switch to neutral position comprises a lever 31, see Figures 1 and 3, which is pivotally carried by uprights 32 and which is provided with forked ends 33 normally resting on the lips 23 of the stopping block 21, see Figure 2.

These forked arms are positioned beneath the rocking member 19, and obviously when they are raised, they will restore the rocking member 19 or movable contact member to its neutral position, irrespective of the direction towards which the member 19 has been rocked. The other end of the lever 31 is pivoted loosely, that is to say with some lost motion, to a plunger 34, see Figure 3, which has an upper reduced extension 35 projecting from the housing 1 and equipped with an insulating, cone-shaped, cam member or button 36. Further, the plunger is provided with a lower reduced extension 37 projecting through the bottom of the housing and surrounded by a compression spring 38 to normally hold the plunger in its raised position. If desired, a small cup-shaped housing 39 may be provided for the lower end of the plunger, see Figure 3.

The steering wheel hub is provided with a clamping member 40, which is in turn equipped with one or more cam members or restoring members 41. In the form shown, two members 41 have been indicated, see Figures 1, 2 and 3, although it has been found that the device will satisfactorily operate if only one member is provided. In the event that one member is provided in place of the two members 41, it will occupy a position at right angles to that taken by the members 41, as is obvious from an inspection of Figure 1.

The number of restoring cam members 41 carried by the steering wheel is, of course, dependent upon the amount of rotation imparted to the steering wheel in making the turn. Usually the steering mechanism has a sufficient reduction to allow the use of one restoring member.

From Figure 2, it will be seen that the restoring members 41 have a bevelled lower face extending upwardly from opposite sides. The cam member 36 or restoring button is arranged in the path of travel of the members 41, so that when the steering wheel is rotated in making a turn, a member 41 will engage and depress the cam member 36 and consequently will rock the forked ends 33 of the lever 31 upwardly into engagement with the rocking contact member 19 and thus will automatically restore said rocking contact member.

Referring to Figures 3 and 5, it will be seen that the conductors extend outwardly through the bottom of the housing and preferably an insulating bushing 42 being provided, as shown in Figure 3. The conductor 15 leads to the battery 16, as shown in Figure 5, and the conductors 10 and 11 lead to the lamps 43 and 44, respectively. The other side of the lamps are grounded, as shown in Figure 5. These lamps are preferably carried in the upper and lower compartments of a signal light 45, see Figure 5, and it is preferable to provide a parking lamp 46 within such signal light. The signal light shines both to the front and rear of the automobile and may be mounted on each fender and at the rear of the automobile.

It is preferable to provide transparent or translucent panels for the different lamps, for instance the lamp 43 may have a green panel indicated by the reference character 47, the lamp 44 may have an amber panel indicated by the reference character 48, and the parking lamp 46 may have a white panel indicated by the reference character 49, see Figure 5. The specific signal light employed, of course, may be varied.

From the description and drawing, it is clear that a very simple and easily produced device has been made which is very compact, which automatically restores itself, and which may be operated with the utmost facility by a driver.

Further, it will be seen that the movable contact member is normally free of connection with any live portion or any other portion of the electrical circuit.

It will be seen further that a novel form of cooperating contact members has been provided by this invention which insures a good electrical contact.

Although this invention has been described in considerable detail, it is to be understood that such description is intended as illustrative rather than limiting, as the invention may be variously embodied and is to be interpreted as claimed.

I claim:

1. A signal switch for automotive vehicles provided with a steering column and a steering wheel, said switch comprising a housing supported rigidly from said steering column, a rocking switch member provided with a pair of stationary contacts and a pivotally mounted movable contact, and having a manually operable projecting portion adapted to be rocked towards the direction of turn to selectively engage the desired stationary contact, and automatic means having a single projecting cam member operated from the steering mechanism for restoring the said pivotally mounted movable contact to neutral position, irrespective of the direction in which said pivotally mounted movable contact was rocked.

2. A signal switch for automotive vehicles having a steering column and a steering wheel, said signal switch comprising a housing adapted to be clamped to an immovable portion of the steering column, a rocking contact member pivotally mounted within said housing and having a projecting manually operable member, a pair of stationary contacts arranged adjacent each end of said rocking switch member and adapted to be bridged by said rocking switch member when said member is rocked in the appropriate direction, a lever having a pair of forked arms positioned adjacent said rocking switch member for restoring said rocking switch member when said lever is operated, and automatic means having a single projecting cam member actuated from said steering wheel for operating said lever to restore said switch when said steering wheel is rotated, irrespective of the direction in which said switch is rocked.

3. A signal switch for automotive vehicles having a steering column and a steering wheel, said signal switch comprising a housing adapted to be clamped to said steering column, a rocking switch member pivoted intermediate its ends within said housing and having a manually operable member projecting from said housing, a pair of spaced contact members located beneath opposite ends of said rocking switch member and bridged by said rocking switch member when such member is rocked in the appropriate direction, a restoring lever pivotally mounted intermediate its ends within said housing at right angles to said rocking switch member and having one end forked and positioned beneath said rocking switch member, a spring pressed plunger pivoted to the other end of said lever and projecting from said housing, and means actuated from said steering wheel for operating said spring pressed plunger.

4. A signal switch for an automotive vehicle having a steering column and a steering wheel, such signal switch comprising a housing adapted to be clamped to said steering column, a rocking switch member pivotally mounted within said housing intermediate its ends and having an outwardly projecting manually operated member adapted to be rocking in the desired direction of turn of the vehicle, stationary contact members located adjacent each end of said rocking switch member and adapted to be selectively engaged thereby, a restoring lever pivoted intermediate its ends within said housing at right angles to said rocking switch member and having a pair of forked arms adjacent one end and located beneath said pivoted switch member, a stopping block having a bevelled upper face and having outwardly projecting flanges adapted to receive the forked arms of said lever, a spring pressed plunger carried within and projecting from said housing and operatively connected to the other end of said lever from said forked arms, said plunger having an insulating cam member at its upper end, and cam means carried by said steering wheel for engaging said cam member when said steering wheel is operated.

BORNETT L. BOBROFF.